Feb. 26, 1952 R. W. MARSHALL 2,587,055
ELECTRICAL CAVITY RESONATOR FOR MICROWAVES
Filed Dec. 6, 1946

INVENTOR
R.W.MARSHALL
BY
E. V. Griggs
ATTORNEY

Patented Feb. 26, 1952

2,587,055

UNITED STATES PATENT OFFICE 2,587,055

ELECTRICAL CAVITY RESONATOR FOR MICROWAVES

Robert W. Marshall, Summit, N. J., assignor to Bell Telephone Laboratories, Incorporated, New York, N. Y., a corporation of New York Application December 6, 1946, Serial No. 714,621

1 Claim. (Cl. 178—44)

This invention relates to selective electrical apparatus and more particularly to wave meters and echo boxes of the resonant cavity type.

An object of the invention is to suppress undesired modes of oscillations within an electrical resonant chamber or cavity resonator.

A further object of the invention is to enable sharp discrimination between oscillations of one transverse electric mode as, for example, desired oscillations of $TE_{0\,1\,12}$ mode and undesired oscillations of other transverse electric modes such as $TE_{3\,2\,4}$, $TE_{2\,2\,8}$ and $TE_{6\,1\,6}$.

Another object of the invention is to improve the selectivity characteristics of a cavity resonator.

An additional object of the invention is to provide a microwave wave meter with untuned and tuned input channels which may remain effectively connected to the detector of the wave meter without interfering with or masking the effects of each other.

In accordance with one embodiment of the invention a microwave oscillation detector is mounted together with its electrical pickup connections within and near one end of a shielded enclosure. In the region of the opposite end of the enclosure are aperture couplings to a tunable resonant cavity and an untuned input chamber, the coupling to the untuned chamber being directive to transmit energy from that chamber toward the detector but not toward the cavity resonator.

To enhance the selectivity of the cavity resonator which is in the form of a cylinder with a tuning piston and is operated in a $TE_{01n}$ mode of oscillation, an internal attenuator is mounted with its energy dissipating surface lying approximately along a nodal plane for oscillations of the desired mode. In one embodiment, the outer peripheral margin of the attenuator fits snugly within an internal circumferential groove in the walls of the resonance chamber. In a modification, the attenuator is provided with integral lugs which project outwardly through apertures in the wall of the resonator and are attached to and supported by an external ring surrounding the chamber structure.

In the drawing, Fig. 1 is a diagrammatic perspective view of a microwave testing apparatus;

Figure 1:
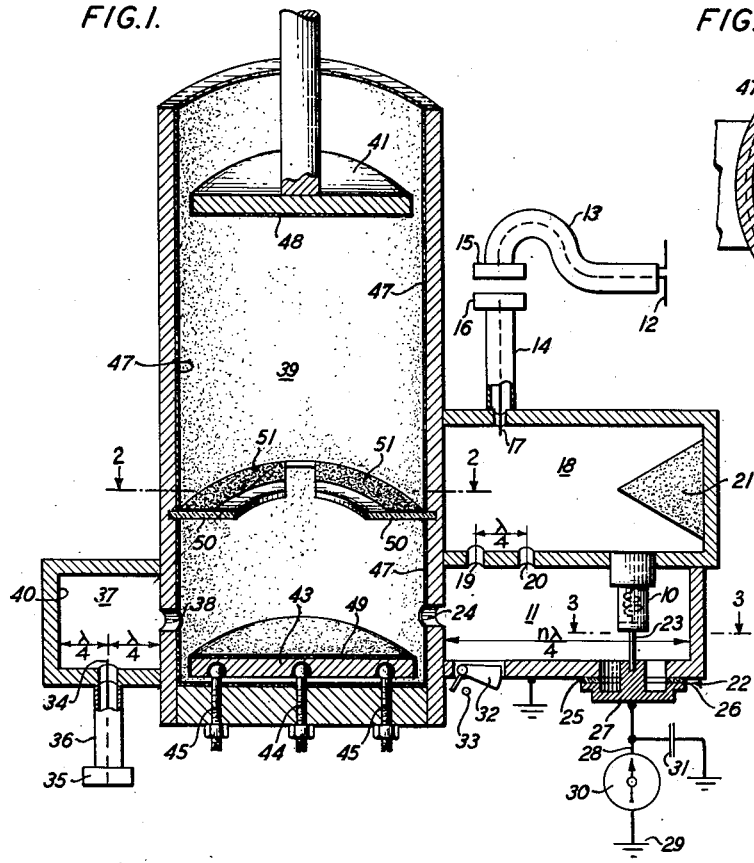
Figure 2:
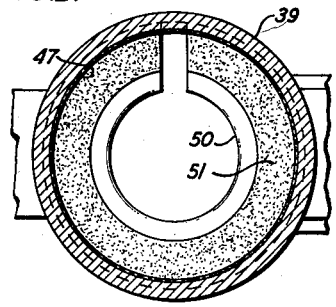
Fig. 2 is a transverse section along the plane 2—2 of Fig. 1, viewed in the direction of the arrows.
Figure 4:
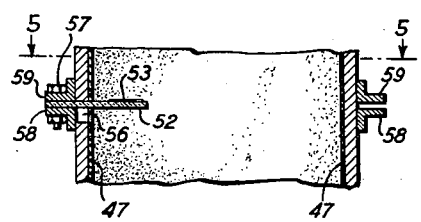
Figure 5:
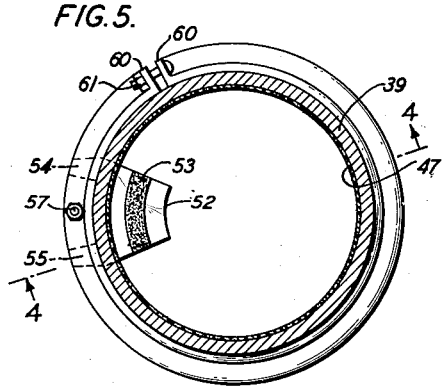

Fig. 4 presents a modification of the mode suppression attenuator of Fig. 1, and Fig. 5 is a section along the horizontal plane through broken line 5—5 of Fig. 4.

Referring to Fig. 1 there is shown a detector 10 mounted in a shielded detector chamber 11 to which oscillation energy of microwave frequency may be supplied either by a tunable selective input circuit or by an untuned input at the will of the operator. When it is desired to ascertain merely if microwave oscillation energy is present in the region of the testing equipment the untuned input may be used. For this purpose a pick-up antenna which may be a dipole 12 to which a coaxial conductor 13 is connected may be associated in energy transfer relation to the coaxial input stub 14 by plugging terminal plug 15 into jack 16. Input stub 14 terminates in a probe coupler 17 projecting through an aperture into the space within the untuned input wave guide transducer section 18 to set up within the wave guide section a microwave oscillation field corresponding to the energy picked up by dipole 12. The section 18 serves to transmit energy to the detector chamber 11 through a directive aperture coupling consisting of two apertures 19 and 20 with centers spaced a quarter wavelength apart at the median wavelength to be transmitted. Accordingly, energy propagated by the coupler 17 through the chamber 18 in the direction from 19 to 20 will first pass partly through the aperture 19 and tend to proceed both to right and to left in the detector chamber 11. That which passes toward the right to excite the detector 10 is reinforced by additional in-phase energy coming through the aperture 20. That which passes from orifice 19 to the left is opposed and annulled by oscillations which traverse the quarter wavelength to the right inside the chamber 18 between apertures 19 and 20 and after emerging through orifice 20 turn back to the left through detector chamber 11 over the additional quarter wavelength from orifice 20 to orifice 19 so as to be delayed one-half cycle time and therefore to reach orifice 19 just in time to neutralize the left bound oscillations emerging therethrough. Oscillations passing toward the right in untuned input transducer section 18 are absorbed and prevented from reflection to the left by a flat triangular terminating element 21 of energy absorbing material which serves to terminate the transducer section in its own characteristic impedance so as to make it react like a uniform line of infinite length. A specific material used for this purpose involves a plate of phenolic dielectric material with a graphite surface. Accordingly, oscillation energy is supplied from the input section 18 to the detector chamber so as to become incident upon the pick-up lead 23 of detector 10 but not to pass in the opposite direction toward an orifice 24 in the end of the detector chamber 11.

The detector 10 is connected in a microwave pick-up circuit including the conductor 23 in which is induced the microwave electromotive forces applied to the detector. The circuit also includes the by-pass capacitor (illustrated diagrammatically by condensers 25 and 26) which in actual physical embodiment comprises an annular dielectric 22 washer and a circular metallic cap 27 clamped thereagainst so as to be insulated from the chamber 11 and in electric contact with an end of conductor 23. The cap 27 accordingly effectively closes the aperture at the end of conductor 23 to shield the internal space within chamber 11 from ingress of moisture or of extraneous oscillation energy. Details of such a structure are illustrated in the co-pending application of W. A. Edson, Serial No. 589,154, filed April 19, 1945, for Electrical Testing System, now Patent No. 2,414,456, issued January 21, 1947.

Figure 3:
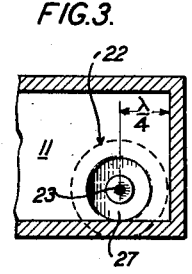
Fig. 3 is a section of the detector chamber along plane 3—3 of Fig. 1.

The detector chamber 11 is preferably of a length substantially equal to an integral even number of quarter wavelengths at a desired mean frequency oscillation from the orifice 24 to its reflecting end. The pick-up conductor 23 is preferably at a position about one quarter wavelength from the reflecting end. However, it is not placed centrally of the transducer wave guide from side to side but at a point about one quarter of the width from one side as indicated in Fig. 3. This conductor absorbs substantially all energy coming from the directive coupling and from the reflecting end of the chamber 11 so that there is negligible energy propagation from the chamber 11 to the aperture 24.

Microwave oscillations impressed upon the detector 10 give rise to pulses of rectified current which are supplied over a path including conductor 28 and ground connections 29 to a milli-ammeter or other suitable current indicator 30. A grounded smoothing condenser 31 is connected in shunt to the indicator 30 in well-known manner. The indicator 30 serves to show the presence of microwave energy and, also, to give an indication of its intensity.

In order to protect the detector 10 from overload a reactance vane attenuator 32 is provided. This is a thin metal vane which is pivotally mounted on the detector chamber and may be projected to a position therewithin through a very narrow slot. By careful design of its contour the vane may be made to introduce an attenuation which increases in a substantially linear fashion to a maximum attenuation position at which further displacement is checked by a stop 33.

After the presence of microwave energy has been determined it may be desirable to explore its frequency spectrum in order to learn the strength of the field throughout a certain frequency range. This may be done by transferring plug 15 to jack 35 associated with the coaxial conductor 36 which terminates in a probe microwave coupler 34 projecting through a small opening into an input transducer 37 which is coupled by an orifice 38 to a cavity resonator 39. The cavity resonator is coupled in turn to the detector chamber 11 by orifice 24 so that energy transmitted over conductor 36 is supplied by the input transducer 37 to the resonator 39 which selects therefrom oscillations of a single frequency or of an extremely narrow band of frequencies and supplies the selected energy to the detector chamber 11 so that it may be measured and indicated by the detector 10 and indicator 30.

The probe 34 is preferably positioned in the input transducer at a distance of approximately a quarter wavelength from the face of the wall including the orifice 38 and from the face 40 of the opposite reflecting wall. This structure makes for efficient transfer of the input oscillation energy to the field of the cavity resonator.

The cavity resonator 39 is cylindrical in form and is designed to selectively sustain oscillations of transverse electric mode as for example, $TE_{0\ 1\ 12}$ mode. The resonator is provided with a tuning piston 41 the position of which may be adjusted as desired by a calibrated operating mechanism, not shown. At the lower end of the resonator 39 is a movable end plate 43 pivotally supported at its central point by a pivot bolt 44 extending through the lower end closure of the resonator. The end plate 43 may be fixed in any desired position by manipulation of the adjusting screw bolts 45 which are arranged in symmetrical fashion about the pivotal bolt 44. It is thus possible to bring the upper surface of the plate 43 into nice parallelism with the lower face of the piston 41. The resonance chamber 39 may be constructed of any suitable rigid material of plastic, vitreous or metallic types. It is important, however, that its inner cylindrical surface be electrically highly conductive and for that purpose a coating such as copper, silver or gold may be deposited or plated thereon as indicated at 47. In like manner, the lower surface of the piston 41 and the upper surface of the movable end plate 43 should be coated with highly conductive material as indicated at 48 and 49 respectively. The piston, itself, may consist of dielectric material and in particular of wood or of a phenolic condensation product of the type known as "Bakelite." As an alternative structure, the lower face of the piston 41 may, if desired, be provided by cementing to the Bakelite body of the piston a sheet of silver plated copper foil.

In order to be able to know that at any position of the tuning piston 41 the oscillations excited within the resonator 39 are of a particular frequency corresponding to the calibration of the device for that position of the tuner it is important to suppress extraneous or undesired modes of oscillation. If, for example, the resonator is to be operated in $TE_{0\ 1\ 12}$ mode, other transverse electric modes such as $TE_{3\ 2\ 4}$, $TE_{2\ 2\ 8}$ and $TE_{6\ 1\ 6}$ modes may prove troublesome and should be inhibited. For this purpose applicant has devised an attenuator which selectively attenuates oscillations of the undesired transverse electric modes with little accompanying attenuation of the oscillations of the desired mode. The attenuator comprises a split annulus 50 of dielectric material with a resistance coating 51 which may comprise colloidal graphite painted or sprayed on the upper surface of the annulus. The annulus is sprung into position in a narrow circumferential slot extending around the inside of the resonator 39 at a position such that the resistance coating lies in a nodal plane for oscillations of the desired $TE_{0\ 1\ 12}$ mode at a mean frequency of the range of oscillations for which the device may be tuned. The nodal plane selected at which the attenuating coating is to be located is preferably one of the lowermost nodal planes for the desired oscillations and hence in that general region of the resonator 39 close to the end plate 43. However, it may be impracticable to employ the most immediately adjacent plane or even the second because of interference with the coupling apertures. In any event, however, the position of a nodal plane selected should be one at which relatively high electric field intensity exists for oscillations of the unwanted or extraneous modes.

In some instances, it is desirable to make an extremely nice adjustment of the position of the dissipating coating. The structure of Figs. 4 and 5 lends itself to that purpose. In lieu of the split annulus 50 a very thin flat sector-shaped plate 52 of low loss dielectric material may be coated with colloidal carbon 53 or other energy dissipative substance and mounted in position on an externally adjustable support. The plate 52 is provided with two integral supporting members 54 and 55 which extend through slots 56 in the cylindrical wall of the resonator and are clamped by bolts 57 between two rings 58 and 59 which closely surround the external wall of the resonator 39. Rings 58 and 59 are split and the upper ring 59 terminates in flanges 60 which may be clamped together by a clamping bolt 61 to firmly fix the position of the supporting means. Inasmuch as the plate 52 occupies a relatively small portion of the entire internal periphery of the resonator it may be placed at the precise nodal plane with much greater accuracy than was possible with the annulus 50 in the fixed groove of the structure of Fig. 1. The rings 58 and 59 serve to cover and close the otherwise open portion of the slot 56.

The wavemeter apparatus which has been described is capable of a number of different uses. With the non-tuned input it is possible to ascertain the presence in the region and the intensity of microwave oscillations. By a very simple switching operation the selective resonator is brought into use to enable determination of the frequency of incoming oscillations. The apparatus may be used, for example, in connection with a radar transmitter to make a spectrum analysis and thus determine whether the train of emitted oscillations is of the proper duration. It may also be used as an artificial target or echo box in which case the field of oscillations for which the resonator 39 is tuned may build up strength during receipt of the pulse from the radar transmitter and may re-emit oscillations of that frequency to the radar receiver thus giving an overall performance check of the radar.

What is claimed is:

In combination, a high Q cavity resonator, means for exciting said resonator with microwave oscillations in a $TE_{01n}$ mode, means fastened to the resonator side wall for discriminating against extraneous modes, an input transducer comprising a section of wave guide coupled to said resonator by orifice coupling and a coaxial line connected thereto, said line terminating in a probe extending into said guide parallel to the resonator axis, said probe being spaced equidistant from said orifice coupling and the opposing wall of said guide, said spacing being $\lambda/4$, where $\lambda$ is the operating wavelength.

ROBERT W. MARSHALL.

REFERENCES CITED

The following references are of record in the file of this patent:

UNITED STATES PATENTS

| Number | Name | Date |
|---|---|---|
| 2,088,749 | King | Aug. 3, 1937 |
| 2,151,118 | King | Mar. 21, 1939 |
| 2,261,130 | Applegate | Nov. 4, 1941 |
| 2,267,289 | Roosenstein | Dec. 23, 1941 |
| 2,281,550 | Barrow | May 5, 1942 |
| 2,293,839 | Linder | Aug. 25, 1942 |
| 2,396,044 | Fox | Mar. 5, 1946 |
| 2,413,939 | Benware | Jan. 7, 1947 |
| 2,414,456 | Edson | Jan. 21, 1947 |
| 2,416,168 | Fiske | Feb. 18, 1947 |
| 2,423,390 | Korman | July 1, 1947 |
| 2,427,107 | Landon | Sept. 9, 1947 |
| 2,429,601 | Biskeborn | Oct. 28, 1947 |
| 2,434,508 | Okress | Jan. 13, 1948 |
| 2,439,388 | Hansen | Apr. 13, 1948 |
| 2,500,417 | Kinzer | Mar. 14, 1950 |
| 2,527,619 | Brehm | Oct. 31, 1950 |